United States Patent [19]

Davis et al.

[11] Patent Number: 5,637,366
[45] Date of Patent: Jun. 10, 1997

[54] POLYESTER-CONTAINING BIAXIALLY-ORIENTED POLYPROPYLENE FILMS AND METHOD OF MAKING THE SAME

[75] Inventors: Alan M. Davis, Barrington; John Lawrence, Schaumburg; Deepak Mehta, Naperville, all of Ill.

[73] Assignee: QPF, Inc. (Delaware Corporation), Streamwood, Ill.

[21] Appl. No.: 483,687

[22] Filed: Jun. 7, 1995

[51] Int. Cl.$^6$ .............................. B29C 55/14; B32B 7/02
[52] U.S. Cl. ........................ 428/35.8; 156/244.14; 156/244.17; 264/171.28; 264/173.14; 264/173.15; 264/173.19; 264/289.3; 264/290.2; 264/300; 428/35.9; 428/36.91; 428/447; 428/483; 428/451; 428/517
[58] Field of Search ............ 264/173.15, 171.28, 264/173.14, 173.19, 290.2, 300, 135, 289.3; 428/35.8–35.9, 36.91, 447, 483, 451, 517; 156/244.14, 244.17

[56] References Cited

U.S. PATENT DOCUMENTS

| | | | |
|---|---|---|---|
| 4,274,900 | 6/1981 | Mueller et al. | 156/229 |
| 4,709,534 | 12/1987 | Sengewald | 53/452 |
| 4,734,317 | 3/1988 | Bothe et al. | 428/215 |
| 4,839,123 | 6/1989 | Duncan | 264/173.15 |
| 4,874,656 | 10/1989 | Rantanen | 428/216 |
| 4,924,525 | 5/1990 | Bartasis | 2/2 |
| 5,064,579 | 11/1991 | Kendall et al. | 264/173.15 |
| 5,151,317 | 9/1992 | Bothe | 428/216 |
| 5,152,946 | 10/1992 | Gillette | 264/230 |
| 5,229,180 | 7/1993 | Littmann | 428/43 |
| 5,302,327 | 4/1994 | Chu et al. | 264/173.14 |
| 5,324,467 | 6/1994 | Anderson, II | 264/171 |
| 5,353,927 | 10/1994 | Stupar et al. | 206/219 |
| 5,353,985 | 10/1994 | Nägeli et al. | 229/123.1 |
| 5,380,587 | 1/1995 | Musclow et al. | 428/353 |
| 5,387,449 | 2/1995 | Kunz et al. | 428/35.4 |

FOREIGN PATENT DOCUMENTS

| | | |
|---|---|---|
| 418836 | 3/1991 | European Pat. Off. . |
| 444340 | 4/1991 | European Pat. Off. . |

*Primary Examiner*—Jeffery R. Thurlow
*Attorney, Agent, or Firm*—Marshall, O'Toole, Gerstein, Murray & Borun

[57] ABSTRACT

Polyester-containing multilayer biaxially-oriented polypropylene films are provided. According to the invention, a two- or three-layer polyester-containing cap layer is bonded to a monoaxially oriented polypropylene core, followed by orientation of the resulting composite in a direction transverse to the direction of orientation of the core layer. At least one tie layer is interposed between the core and the polyester. Advantageously, the polyester contains silicone fluid as a processing aid.

16 Claims, No Drawings

POLYESTER-CONTAINING BIAXIALLY-ORIENTED POLYPROPYLENE FILMS AND METHOD OF MAKING THE SAME

BACKGROUND OF THE INVENTION

1. Field of the Invention

The invention relates to multilayer polyolefin film structures and methods of making the same and, more particularly, the invention relates to a biaxially-oriented polypropylene film incorporating at least one polyester layer.

2. Description of Related Art

Biaxially-oriented polypropylene (BOPP) films are widely used in packaging because they have good stiffness, strength, optical properties (low haze and high gloss), and moisture barrier properties. Users of packaging films, particularly users of biaxially oriented polypropylene films, are continually seeking structures with improved printability, metallizing properties, and gas barrier. Because of their olefinic nature, typical BOPP constructions have low surface energy and require treatment (corona, flame, etc.) in order to be printed or metallized. Polyester is known to have high surface energy and possesses excellent printing and metallizing attributes. Additionally, polyester, both in clear and metallized structures offers improved gas barrier performance to BOPP films. This is especially true in the case of metallized polyester films which are in order of magnitude or more lower in oxygen transmission rate.

Although there has been a long felt need for BOPP films incorporating polyester layers, problems in obtaining acceptable optical and processability characteristics, adequate interply adhesion, and other properties have been encountered in previous attempts to produce polyester-containing BOPP structures. For example, U.S. Pat. No. 5,324,467 a process for the preparation of an oriented multilayer laminate film having at least three layers, including polypropylene, a tie layer, and copolyester is disclosed. The films are formed by combining the layers in the molten state, either in coextrusion, or in separate extrusions brought together outside the die, then subsequently cooling the film, orienting it uniaxially or biaxially, and heat setting to lock in the properties. A major problem in producing a structure according to this method on commercial scale equipment is the strong tendency of polyester to adhere to the heated metal rolls of the machine direction orientation section. This makes it difficult to achieve good optical properties free of visual defects and may also decrease other properties such as the seal initiation temperature.

U.S. Pat. No. 4,874,656 describes a multilayer laminate having a high mechanical resistance and an impermeability to gases and vapors. In the disclosed structures, a polyester layer is joined to a polypropylene layer after the polypropylene is biaxially-oriented, the polyester layer is quite thick (i.e., 12 to 24 microns), and the structure includes a layer of metallic foil and a layer of polyethylene. While joining a polyester layer to a BOPP layer after biaxial orientation is possible, this method is impractical for incorporating thin layers of polyester. U.S. Pat. No. 4,924,525 also describes a structure wherein a polyester laminate is adhered to a BOPP film after the polypropylene is biaxially oriented, precluding the use of thin polyester layers in the final structure.

SUMMARY OF THE INVENTION

It is an object of the invention to overcome one or more of the problems described above.

Accordingly, the invention provides a biaxially-oriented polypropylene film incorporating a polyester layer, and a method of making the same.

The inventive multilayer film is prepared by the steps of forming a polypropylene core, orienting the core in a first direction, providing on at least one side thereof a multilayer outer film (cap layer) comprising at least one polyester layer and at least one tie layer interposed between the polyester layer and the core, and orienting the resulting multilayer film in a second direction transverse to the first direction.

Advantageously, the polyester layer contains sufficient silicone fluid to provide substantially uniform stretching characteristics.

Further objects and advantages of the invention will be apparent to those skilled in the art from a review of the following detailed description taken in conjunction with the appended claims.

DETAILED DESCRIPTION OF THE INVENTION

The invention addresses various concerns of the prior art by providing a structure that positions the polyester at the outer layer of the film, thereby taking advantage of the improved printability and metallizing attributes of polyesters, also eliminates the difficulty of contacting polyester over the heated rolls of the machine direction orienter and, further, provides thin polyester layers that allow a structure of economic value to be produced. An additional benefit of the invention is that a broad range of polyester products, including amorphous homopolymer grades, may be included in the inventive film structures. This allows the designer a wide choice in making films with improved optical properties, printability, and metallizing attributes as well as stiffness and heat resistance.

Generally, the polyester-containing BOPP film of the invention includes a core and a multilayer outer film (cap layer) or film adhered to at least one surface of the core. The multilayer BOPP film of the invention is prepared using interdraw coating or lamination techniques.

The BOPP core comprises a layer of polypropylene and, in one embodiment, further comprises a tie layer, as described below.

The cap layer is applied on at one or both surfaces of the monoaxially oriented core layer. The cap layer comprises a layer of a polyester resin and at least one tie layer comprising a polyolefin adhesive. The polyolefin adhesive tie layer is disposed between the polyester layer and the core.

Additionally, the polyester layer contains a sufficient amount of silicone fluid as a processing aid to provide substantially uniform stretching characteristics to the polyester layer.

In a preferred embodiment, the cap layer contains a second tie layer comprising a polypropylene copolymer or terpolymer or linear ethylene polymer interposed between the polyolefin adhesive tie layer and the core. In a variation on this embodiment, the polypropylene copolymer or terpolymer tie layer forms part of the core, and is positioned adjacent the polyolefin adhesive tie layer in the final structure. This tie layer may be oriented with the polypropylene layer of the core.

The multilayer BOPP film of the invention is prepared by the steps of forming and orienting the core in a first direction, providing the cap layer to at least one side of the monoaxially oriented core to form a multilayer film, and then orienting the resulting multilayer film in a second direction transverse (and preferably perpendicular) to the first direction to provide a biaxially-oriented multilayer film.

The biaxially-oriented multilayer film may then be subjected to a heat setting treatment to allow the film to crystallize. In a preferred embodiment, an outer surface of the polyester layer is metallized.

The invention is described in more detail below.

Core Structure

As stated above, the core may be a polypropylene monolayer or may comprise a multilayer structure including a core layer of a polypropylene with a tie layer on one or both sides of the core.

The term "polypropylene" as used herein with reference to the core generically denotes a semi-crystalline polymer with a majority of polymerized propylene, and specifically includes isotactic homopolymers of propylene, copolymers of propylene with up to 25 weight percent ethylene or butene, terpolymers of propylene with ethylene and butene, and mixtures thereof.

Preferred polypropylenes are those selected from propylene homopolymers and copolymers of propylene with less than three weight percent comonomer such as ethylene or butene. Melt flow rates of 1 to 15 dg/min, and preferably from 1.5 to 6 dg/min, as measured according to ASTMD1238-90b, Condition 230/2.16 (formerly Condition F) are suitable for sheet or blown film.

The thickness of the core layer is limited only as dictated by oriented polypropylene tenter process limitations, and typically will range from about 12 microns to about 50 microns.

The core may optionally include a tie layer comprising a polypropylene copolymer or terpolymer or a linear ethylene polymer coextruded with the polypropylene core layer. While the polypropylene core may be a homopolymer, the coextruded tie layer comprises a copolymer of propylene with up to 25 weight percent of ethylene or butene, mixtures thereof, or a linear ethylene polymer such as linear low density polyethylene (LLDPE). The thickness of the total core structure is limited only by the tenter process limitations as described above and thus is typically about 12 microns to about 50 microns thick. The thickness of an individual coextruded tie layer is typically about 0.5 microns to about 2 microns thick.

Cap Film

The cap layer comprises a two-layer or three-layer film, including an outer, polyester layer and a first tie layer comprising a polar or grafted olefin polymer adhesive. Preferably, the cap layer further includes a second tie layer comprising a copolymer of propylene with up to 25 weight percent of ethylene or butene, a terpolymer of propylene, ethylene, adhesive, mixtures thereof, or a linear ethylene polymer, such as LLDPE.

The polyester layer comprises a crystalline copolyester, a crystallizable amorphous polyester homopolymer, or a crystallizable amorphous copolyester. (The terms "crystalline" and "amorphous" describe the solid state structure of the polyester as supplied by the vendor and prior to orientation.)

By the term "copolyester" it is meant that the polyester is the reaction product of at least one polyol and one carboxylic acid, with there being a total of at least three monomers selected from the polyols and acids. "Homopolymer" polyesters are understood to include a single polyol and a single acid moiety.

The polyester layer contains, as a processing aid, a sufficient concentration of a silicone fluid (i.e., a dimethyl polysiloxane or equivalent), preferably of a high molecular weight (e.g., having a viscosity in the range of 300,000 cps to about 2,000,000 cps, highly preferably about 1,000,000 cps as measured by Brookfield viscometer) in an amount sufficient to provide uniform polyester stretching characteristics. Typically, a polyester layer intended for subsequent metallization will contain about 1,000 ppm to about 3,000 ppm silicone fluid, preferably about 1,000 ppm to about 2,000 ppm (based on the weight of the polyester) in the polyester layer. Polyesters not intended for metallization may contain higher concentrations of silicone fluid, if desired.

Baysilone silicone fluid M 1,000,000 is preferred silicone fluid.

The silicone fluid may be added to the polyester by intensive mixing with pellets of polyester resin in order to coat the pellets, followed by drying of the coated pellets, and extrusion. A Henschel mixer is suitable for preparing the silicone fluid-coated pellets.

The polyolefin adhesive tie layer adhered to the polyester layer comprises a copolymer of ethylene with an ester such as an ethylene/vinyl acetate copolymer, an ethylene/methyl acrylate copolymer, an ethylene/n-butyl acrylate copolymer, an ethylene/ethyl acrylate copolymer, or ethylene methacrylic acid (EMAA), for example. Alternatively, the first tie layer may comprise a grafted polyolefin adhesive, such as a polyethylene or polypropylene backbone grafted with at least one ethylenically unsaturated carboxylic acid, anhydride, or other derivative, as known in the art.

In a preferred embodiment, the cap layer further comprises a second tie layer comprising a propylene copolymer or terpolymer or a linear ethylene polymer such as LLDPE, as described above. In this embodiment, the ethylene/ester copolymer or grafted polyolefin adhesive is interposed between the second tie layer and the polyester layer.

The respective thicknesses of the polyester layer, first tie layer, and second tie layer may vary within wide ranges, and are substantially independent of each other. Typical approximate thicknesses for the polyester, first tie layer, and second tie layer in the final film are as follows:

| Polyester layer: | 0.75 to 2.5 microns |
| First tie Layer: | 1.0 to 2.5 microns |
| Second tie Layer: | 0.25 to 1.5 microns |

Preferably, the total thickness of the cap layer is in the range of about 2.0 to 6.5 microns in the final film.

The cap layer may be formed by any suitable process, including blown or cast film coextrusion, as desired.

Although no further additives to the polyester layer are necessary, suitable antiblock agents such as zeolites may be advantageously used. Other silicates, clays, talcs, and silicas are suitable antiblock agents, and the antiblock agents are generally used in a concentration of about 500 to about 10,000 ppm (preferably about 500 to about 1500 ppm) based on the weight of polyester.

Other additives, particularly stabilizers, may be used to protect the cap layer from degradation during processing, or to impart other desired attributes to the final film.

Preparation of Multilayer BOPP Film

The polyester-containing cap layer is added to the core by interdraw coating or lamination. (Interdraw coating or lamination processes are disclosed in U.S. Pat. No. 5,156,904 to Rice et al., the disclosure of which is incorporated herein by reference.) In this method, the core is formed by extruding and casting the polypropylene core, orienting the core in a first ("machine") direction, forming the polyester-containing outer films, providing the cap layer on one or both sides of the oriented core to produce a monoaxially oriented multilayer film, and orienting the resulting multilayer film in a second direction transverse (and preferably perpendicular) to the first direction.

In practice, a monolayer core or a coextruded laminate of the core polypropylene and a propylene copolymer or terpolymer or linear polyethylene tie layer may be cast onto a roll maintained at a temperature in the range of, e.g., 10° C. to 100° C., reheated over rolls heated to a temperature (e.g., 100° C. to 204° C.) high enough to soften the polymer(s) in the core yet below the melting point of the propylene polymer thereof, and then oriented in the machine direction. After the subsequent addition of the cap layer(s), the resulting film is reheated to a temperature preferably higher than the softening point of the outer film layers (e.g., 73° C.) and somewhat below the melting point of the core polypropylene (e.g., 150° C. to 165° C.), and the film is oriented in a second direction transverse (and preferably perpendicular) to the machine direction.

A cap layer may be applied to one or both sides of the core. Similarly, the core may contain a propylene polymer or terpolymer or linear ethylene polymer tie layer on one or both sides of the polypropylene core. The multilayer BOPP structure may but need not be symmetrical; for example, a two-layer cap film may be disposed on one side of the core with a three-layer cap film on the other.

The following non-limiting examples illustrate the practice and benefits of the invention.

EXAMPLES

All the films described in the following examples were produced in a sequential orientation process. In this process the core layer was extruded and formed into a sheet prior to machine direction orientation. The core layer was then oriented approximately 500%. The cap layers were adhered to the core layer and the resulting multilayer film was fed to a tenter oven where the film was transverse oriented approximately 900%, heat set, cooled, and would onto a roll. The initial thickness of the core layer in all the examples was approximately 810 microns. The thickness after machine direction orientation was 162 microns. The cap layers evaluated range in thickness from 20 to 35 microns. The thickness of the final, multilayer films varied from about 20 to 30 microns. The output rate of the examples ranged from 250 lb/hour to 400 lb/hour (113 kg/hour to 183 kg/hour). The core layers were produced using one of two commercially available isotactic homopolymer polypropylene resin grades - Fina 3275 or Exxon 4152. Other film grade polypropylene resins are suitable for use as the core layer in the experiments described. Example 4 describes representative process conditions used to produce the films in all the examples.

Sample Evaluation Methodology

Several films made according to the invention were evaluated for the key attributes listed below. Since an intended use of the films is for packaging, either alone or in laminations, the films should exhibit good appearance, sealability, and integrity. In addition, economic considerations dictate that the films process readily with broad process capability and low waste.

Visual Criteria

All the clear films were rated for haze and optical defects. Haze is measured according to ASTM D-1003.

| Rating | Comments |
| --- | --- |
| Excellent | Haze < 2, minimal optical defects |
| Good | Haze < 3, minor optical defects |
| Fair | Haze < 5, some optical defects |
| Poor | Haze > 5 |

Polyester Layer Seal Strength

All the clear (i.e., unmetallized) films were evaluated for seal strength by cutting one-inch wide strips and sealing the polyester surface to itself at three temperatures, i.e., 110° C., 125° C., and 145° C. on a Brugge München heat sealer, type NDS, using a 0.5 second dwell time and 0.5 psi of applied pressure. The seals were pulled on an Instron 4201 testing machine. The peak value was noted and the mode of failure was determined by visual inspection. An acceptable seal is deemed to have a minimum peak strength of 75 grams/inch. "Destruct" denotes a failure mode at the sealing interface or excessive distortion of the film. "Delamination" denotes a failure mode between layers of the film (e.g., tie/polyester interface or tie/core interface).

| Rating | Comments |
| --- | --- |
| Excellent | Seal initiation at lowest temperature, failure mode "Destruct" |
| Good | Seal initiation below 125° C., failure mode "Destruct" |
| Fair | Seal initiation at 110° C., failure mode "Delamination" |
| Poor | No acceptable seals |

Interlaminar Adhesion Before Metallizing

This property was evaluated by heat sealing films together as described above and noting the failure mode at various temperatures. The test was conducted on clear film samples before metallizing to determine the effect of that process on interlaminar adhesion.

| Rating | Comment |
| --- | --- |
| Excellent | 100% DESTRUCT seals at all temperatures |
| Good | DESTRUCT failure mode predominates |
| Fair | DESTRUCT failure mode in some cases |
| Poor | 100% DELAMINATION |

Metal Adhesion

This property was evaluated by applying five eight-inch long strips of Scotch brand 610 tape (by 3M) to the metallized surface in both the machine and transverse directions, pressing the strips firmly to the film and then rapidly pulling the tape at a 90° angle to the substrate. The mode of failure (metal delamination or delamination at a polymer/polymer interface) was denoted as was the percent of metal removed from the surface. The samples were then rated.

| Rating | Comments |
| --- | --- |
| Excellent | 0–10% metal delamination |
| Good | 10–50% metal delamination |
| Poor | >50% metal delamination and/or any sign of delamination at a polymer/polymer interface |

Processability

This is a broad category that includes aspects of preparing the cap layer, adhering the cap layer to the core layer, stretching the combined films, and processing through subsequent operations.

| Rating | Comments |
| --- | --- |
| Excellent | Broad process window, strong adhesion, readily stretches, good winding characteristics, good converting properties |
| Good | Narrower process window, good adhesion, good stretching, winding and converting characteristics |
| Fair | Narrow process window, adequate adhesion, stretches under optimal conditions (some stretching bands evident), adequate converting properties |
| Poor | Difficult to process, inconsistent adhesion, non-uniform stretching characteristics. |

Evaluations of the films are presented in the table entitled "Summary of Results" following the descriptions of the examples.

Example 1

(Comparative) Combining Monolayer Outer Film to Treated Propylene Homopolymer Via Interdraw Lamination In this example, a monolayer core of isotactic polypropylene homopolymer was extruded onto a cast/chill roll, subsequently heat conditioned, oriented 500% in the machine direction and then surface-treated using a flame treatment technique. A monolayer outer film produced using an amorphous copolyester was subsequently adhered to the treated surface of the polypropylene homopolymer. The resultant structure was reheated, transverse direction oriented approximately 900%, cooled, and wound onto a roll.

The film produced in this manner exhibited acceptable optical properties although some nonuniformity in drawing on the copolyester was noted. The interlaminar adhesion to the copolyester of the polypropylene was very low (<50 gm/inch). The film was not subjected to other processes (i.e., metallizing) due to the low interlaminar adhesion.

Example 2

Combining Two Layer Cap Layer With a Propylene Homopolymer Via Interdraw Lamination In this example a monolayer core of isotactic polypropylene homopolymer was extruded onto a cast/chill roll, subsequently heat conditioned, and then oriented 500% in the machine direction. A series of two-layer cap films produced using an amorphous polyester copolymer and various tie layer resins were subsequently adhered to the propylene homopolymer. The resultant structures were reheated, transverse direction oriented approximately 900%, coiled and wound onto a roll. The resulting clear films, prior to metallizing, were tested for visual appearance, seal strength, and interlaminar adhesion. Each of the samples was then metallized to an optical density of 2.1 using aluminum in a vacuum deposition chamber. The metallized samples were evaluated for seal strength (on the non-metallized side) and metal adhesion.

| | | |
| --- | --- | --- |
| Structure 2A) | Polyester Layer: | 90% DuPont Selar PT 8307<br>9% Eastman Kodabond 13162<br>1% C0047 |
| | Tie Layer: | 100% Admer AT776 |
| Structure 2B) | Polyester Layer: | 90% DuPont Selar PT 8307<br>9% Eastman Kodabond 13162<br>1% C0047 |
| | Tie Layer: | 100% Quantum EVA UE 635 (Ethylene-vinyl acetate copolymer) |
| Structure 2C) | Polyester Layer: | 90% DuPont Selar PT 8307<br>9% Eastman Kodabond 13162<br>1% C0047 |
| | Tie Layer: | 100% DuPOnt Bynel 446 and 774 (Maleic anhydride graft modified ethylene vinyl acetate copolymer) |

These films were an improvement of the film produced in Example 1. They exhibited acceptable seal strength and interlaminar adhesion. The film produced in this manner did not draw evenly and proved difficult to process. The two layer cap film was very brittle and had very poor tear resistance. This resulted in difficulty adhering the cap layer to the core layer and in excessive occurrence of web breaks during transverse direction orientation.

Structure 2B exhibited lower seal strength and lower interlaminar adhesion than either structure 2A or 2C. The low melting point of the EVA tie layer led to relatively easy delamination with the polyester layer either during sealing or a result of metallizing.

These trials optimized the layer thickness for a two layer cap film. A copolyester layer in excess of 22 microns thick did not stretch evenly. A copolyester layer less than 6 microns thick did not produce good low temperature seals. These thickness phenomena also held true for the tie layer. A tie layer in excess of 22 microns thick did not stretch evenly. A tie layer less than 8 microns thick had poor ply adhesion and did not draw the copolyester evenly.

Example 3

Addition of a Processing Aid to Improve Drawing of the Polyester Layer

In this example, a monolayer core of isotactic polypropylene homopolymer was extruded onto a cast/chill roll, subsequently heat conditioned, and then oriented 500% in the machine direction. To each surface of the core layer, one of five cap layer constructions was adhered via interdraw lamination. In each case the resultant structure was reheated, transverse direction oriented approximately 900%, cooled, and wound onto a roll. The clear films, prior to metallizing, were tested for visual appearance, seal strength, and interlaminar adhesion. Each of the samples was then metallized to an optical density of 2.1 using aluminum in a vacuum deposition chamber. The metallized samples were evaluated for seal strength (on the non-metallized side) and metal adhesion. The five structures used in this example are described below.

| | | |
|---|---|---|
| Structure 3A) | Polyester Layer: | 89% DuPont Selar PT 8307 (amorphous copolyester) 10% DuPont Selar PR 4234 (toughened copolyester) 1% C0047 slip/anti-block masterbatch |
| | Tie Layer: | Ethylene methyl acrylate copolymer blend (70% Chevron 2205, 30% Chevron EMAC + 2305) |
| Structure 3B) | Polyester Layer: | 93% DuPont Selar PT 8307 (amorphous copolyester) 6% Eastman Kodabond 13162 (PETG copolymer) 1% C0047 MB |
| | Tie Layer: | Ethylene methyl acrylate copolymer (70% Chevron 2205, 30% Chevon EMAC + 2305) |
| Structure 3C) | Polyester Layer: | 93% DuPont Selar PT 8307 (amorphous copolyester) 6% Eastman Kodabond 13162 (PETG copolymer) 1% C0047 MB 3000 ppm silicone fluid |
| | Tie Layer: | Ethylene methyl acrylate copolymer (70% Chevron 2205, 30% Chevron EMAC + 2305) |
| Structure 3D) | Polyester Layer: | DuPont Selar PT8307 (amorphous copolyester) 1% C0047 MB 3000 ppm silicone fluid |
| | Tie Layer: | Ethylene methyl acrylate copolymer (70% Chevron 2205, 30% Chevron EMAC + 2305) |
| Structure 3E) | Polyester Layer: | DuPont Selar PT 8307 (amorphous copolyester) 3000 ppm Baysilone M 1,000,000 silicone fluid |
| | Tie Layer: | Ethylene methyl acrylate copolymer (70% Chevron 2205, 30% Chevron EMAC + 2305) |

In each case, the total thickness of the cap layer was approximately 25 microns, including 15 microns of the polyester layer and 10 microns of the tie layer.

Structure 3A exhibited excessive haze and low gloss (poor visuals) and only fair seal strength due to the presence of the toughened copolyester.

Structure 3B was difficult to process due to brittleness which resulted in uneven stretching and web breaks. This resulted in only Fair visuals, seal strength, and interlayer adhesion due to inconsistency across the web.

Structure 3C exhibited improved processability compared to Structure 3B, which resulted in more uniform properties.

Structure 3D processed similar to Structure 3C without the use of PETG copolymer, which improved processability of Selar PT 8307 in the absence of other additives.

Structure 3E again processed similarly to Structure 3C but had the best visuals and good processability.

In all cases the adhesion of the tie layer to the core was reduced after metallizing resulting in a downgraded performance.

Example 4

Combining Two- and Three-Layer Cap Layer With a Propylene Homopolymer Core

In this example, a monolayer of isotactic polypropylene homopolymer with a melt temperature of 254° C., was extruded onto a cast roll set to a temperature of 36° C. to form the core layer. The initial thickness of the core layer was approximately 810 microns. The core layer surface opposite the cast roll was then contacted against a chill roll with a surface temperature of 72° C. The core layer film was then heat conditioned to 121° C. by contacting with a series of heated rolls and subsequently machine direction oriented 500% across a pair of rolls heated to 141° C. The 162 micron thick, monoaxially oriented core layer was then contacted on each surface to tempering rolls set a temperature of 141° C. At this point in the process, the cap layer structures, each approximately 23 microns thick, were thermally adhered to the core layer. This experiment evaluated three distinct cap layer structures, each of which was applied to the surface of the core layer to make a symmetrical structure. The 208 micron thick, multilayer film structures were then inserted into an endless chain mechanism (being held by a series of clips) and fed to an oven. After reconditioning the multilayer film at 121° C., the structure was transverse direction oriented 900% at a temperature of 138° C. The film exited the oven and was subsequently cooled to approximately 80° C. and would onto a roll. The final thickness of each sample was approximately 23 microns. The output rate of the process was approximately 400 pounds/hour (182 kg/hour). The line speed in the extrusion and casting section was 26 meters/minute while after machine direction orientation the line speed increased to 133 meters/minute.

The clear films, prior to metallizing, were tested for visual appearance, seal strength, and interlaminar adhesion. Each of the samples was then metallized to an optical density of 2.1 using aluminum in a vacuum deposition chamber. The metallized samples were evaluated for seal strength (on the non-metallized side) and metal adhesion.

| | | |
|---|---|---|
| Structure 4A) | Polyester Layer: | 90% DuPont Selar PT 8307 9% Eastman Kodabond 13162 1% C0047 |
| | Tie Layer: | 100% Quantum EVA UE 635 |
| Structure 4B) | Polyester Layer: | 90% DuPont Selar PT 8307 9% Eastman Kodabond 13162 1% C0047 |
| | Tie Layer: | DuPont Bynel 446 and 774 blend |
| Structure 4C) | Polyester Layer: | 100% DuPont Selar PT 8307 1500 ppm Baysilone M 1,000,000 silicone fluid |
| | 1st Tie Layer: | Quantum EMA EMTR002 |
| | 2nd Tie Layer: | Polypropylene Random Copolymer (Exxon 9122, PD 9263, PT 9524, PT 9513, Fina CR6671BB, 6571) |

Structure 4C, incorporating a three-layer cap film structure, exhibited the best properties of any film produced. It processed readily across a broad range of process conditions and produced a film with excellent visual properties, excellent seal strength, and superior interlaminar adhesion - both before and after metallizing. The three-layer outer film drew evenly, processed readily, was not brittle, and had good tear resistance.

Structure 4C exhibited the best interlaminar adhesion, both before and after metallizing. Whereas most two-layer structures exhibited a reduction in interlaminar adhesion after metallizing, the interlaminar adhesion of three-layer outer film structure was unchanged.

Additionally, these tests were useful in optimizing the layer thickness for a three layer cap film. A copolyester layer in excess of 23 microns thick did not stretch evenly. A copolyester layer less than 6 microns thick did not produce good low temperature seals. These thickness phenomena held true for the tie layers. A first tie layer in excess of 8 microns thickness did not stretch evenly. A tie layer less than 4 microns thick had poor ply adhesion and did not draw the copolyester evenly. A second tie layer in excess of 6 microns thick did not stretch evenly. A tie layer less than 4 microns thick had poor ply adhesion and did not draw the copolyester evenly.

Finally, these trials were useful in optimizing the level of process aid required in the polyester layer. A level below 1000 ppm did not give good draw properties. A level in excess of 3000 ppm reduced seal properties and did not give good metal adhesion.

Example 5

Combining Two Three-Layer Cap Films With a Polypropylene Homopolymer Via Interdraw Lamination In this example a monolayer core of isotactic polypropylene homopolymer was extruded onto a cast/chill roll, subsequently heat conditioned, and then oriented 500% in the machine direction. To the core, two three-layer cap layers were adhered to each core layer surface via interdraw lamination. In each case the resultant structure was reheated, transverse direction oriented approximately 900%, cooled, and wound onto a roll. The clear films, prior to metallizing, were tested for visual appearance, seal strength, and interlaminar adhesion. Each sample was then metallized to an optical density of 2.1 using aluminum in a vacuum deposition chamber. The metallized samples were evaluated for seal strength (on the non-metallized side) and metal adhesion.

One of the three-layer cap films was produced using an amorphous copolyester and subsequently adhered to the polypropylene homopolymer. This layer had excellent low temperature seal properties. The second three-layer outer film can be produced with a blend of a crystallizable amorphous copolyester and amorphous copolyester or crystallizable amorphous homopolymer and amorphous copolyester. This layer produced an excellent base for metallization.

| Structure 5A) | Outer Layer: | Blend of DuPont Selar PT 8307/8111 |
| | | 1500 ppm Baysilone M |
| | | 1,000,000 silicone fluid |
| | 1st Tie Layer: | Quantum EMA EMTR002 |
| | 2nd Tie Layer: | Polypropylene random copolymer |
| | | (Exxon 9122, PD 9273, PT 9524, PT9513, Fina CR6671BB, 6571) |
| Structure 5B) | Outer Layer: | Blend of DuPont Selar PT 8307/7001 |
| | 1st Tie Layer: | Quantum EMA EMTR002 |
| | 2nd Tie Layer: | Polypropylene Random Copolymer (Exxon 9122, PD 9263, PT 9524, PT 9513, Fina CR6671BB, 6571) |

The films produced in this manner resolved many of the concerns noted with the previous structures. The multilayer BOPP films drew evenly and did not prove difficult to process. The three layer outer films were not brittle and had good tear resistance.

Observations of useful layer thickness and silicone fluid concentration ranges were identical to those of Example 4.

Summary of Results

| Structure | Visual Rating | Seal Strength | Clear Film Interlayer Adhesion | Metal Adhesion | Processability |
|---|---|---|---|---|---|
| 1 (monolayer) | Fair | Poor | Poor | Poor | Good |
| 2A (2-layer) | Fair | Good | Good | Poor | Poor |
| 2B | Fair | Fair | Fair | Poor | Good |
| 2C | Fair | Good | Fair | Poor | Fair |
| 3A (2-layer) | Poor | Fair | Good | Poor | Fair |
| 3B | Fair | Fair | Fair | Poor | Poor |
| 3C | Good | Good | Good | Poor | Good |
| 3D | Good | Good | Good | Good | Good |
| 3E | Excellent | Good | Good | Good | Good |
| 4A (2-layer) | Good | Fair | Fair | Poor | Fair |
| 4B (2-layer) | Fair | Fair | Good | Poor | Fair |
| 4C (2-layer) | Excellent | Excellent | Excellent | Excellent | Excellent |
| 5A (3-layer) | Good | Excellent | Excellent | Excellent | Good |
| 5A (3-layer) | Good | N/A | Excellent | Excellent | Good |

From the foregoing detailed description, it will apparent to those skilled in the art that the invention provides useful biaxially-oriented polypropylene film composites containing two- or three-layer polyester-containing cap films using amorphous or crystalline copolyesters or amorphous homopolymer polyesters. For some applications, composite films containing three-layer polyester outer layers are preferred as they offer superior processability, interply adhesion, and appearance characteristics.

The use of silicone fluid as a processing aid in the polyester layer improves stretchability and uniformity of the layer and eliminates the need to blend in additional amorphous copolyester as a processing aid. The multilayer BOPP films of invention retain the excellent surface energy characteristics of polyesters, this providing an excellent surface for metallizing. Pretreatment of the polyester layer is not necessary to achieve excellent metal adhesion.

Furthermore, the films can be printed and laminated using conventional methods.

BOPP films utilizing copolyester have excellent optical characteristics and are sealable.

The foregoing detailed description is given for clearness of understanding only, and no unnecessary limitations should be understood therefrom, as modifications within the scope of the invention may apparent to those skilled in the art.

We claim:

1. A method of making a multilayer film, comprising the steps of:
   (a) forming a core layer comprising a polypropylene film;
   (b) monoaxially orienting the core layer in a first direction;
   (c) coating or laminating a multilayer cap film to at least one side of the monoaxially oriented core layer to provide a multilayer film, said cap film comprising at least one polyester layer and at least a first tie layer with said first tie layer interposed between said polyester layer and said core, said first tie layer comprising a polyolefin adhesive, and said polyester layer containing sufficient silicone fluid to impart substantially uniform stretching characteristics thereto; and,
   (d) orienting said multilayer film of step (c) in a second direction transverse to said first direction to provide a biaxially-oriented multilayer film.

2. The method of claim 1 wherein said cap film further comprises a second tie layer comprising a polypropylene copolymer or terpolymer or a linear ethylene polymer, said first tie layer being interposed between said polyester layer and said second tie layer.

3. The method of claim 1 wherein said core layer comprises a second tie layer comprising a polypropylene copolymer or terpolymer or a linear ethylene polymer interposed between the polypropylene of said core layer and said first tie layer of said cap film.

4. The method of claim 2 or claim 3 wherein said second tie layer comprises LLDPE or a polypropylene selected from the group consisting of copolymers of propylene with ethylene or butene, terpolymers of propylene with ethylene and butene, and mixtures thereof.

5. The method of claim 1 wherein the polypropylene of said core layer is selected from the group consisting of isotactic homopolymers of propylene, copolymers of propylene with ethylene or butene, terpolymers of propylene with ethylene and butene, and mixtures thereof.

6. The method of claim 1 wherein said polyester layer comprises a crystalline copolyester prior to orientation.

7. The method of claim 1 wherein said polyester layer comprises a crystallizable amorphous copolyester or a crystallizable polyester homopolymer prior to orientation.

8. The method of claim 1 wherein said polyolefin adhesive of said first tie layer comprises a copolymer of ethylene with an ester.

9. The method of claim 8 wherein said ethylene/ester copolymer is selected from the group consisting of ethylene/vinyl acetate copolymers, ethylene/methyl acrylate copolymers, ethylene/n-butyl acrylate copolymers, and ethylene/ethyl acrylate copolymers.

10. The method of claim 1 wherein said first tie layer comprises a grafted polyolefin adhesive.

11. The method of claim 10 wherein said adhesive comprises a polyethylene or polypropylene backbone grafted with at least one ethylenically unsaturated carboxylic acid, anhydride, or other derivative.

12. The method of claim 1 wherein said silicone fluid has a Brookfield viscosity in the range of about 3,000,000 cps to about 2,000,000 cps.

13. The method of claim 1 wherein said silicone fluid comprises at least about 1000 ppm of said polyester layer.

14. The method of claim 1 further comprising the step of metallizing an outer surface of said polyester layer after step (d).

15. The biaxially oriented multilayer film having a core layer comprising a polypropylene film, at least one silicone-fluid-containing polyester layer, and at least one tie layer interposed between the core and polyester layers prepared by the method of claim 1.

16. The method of claim 1 wherein said polyolefin adhesive of said first tie layer comprises an ethylene methacrylic acid copolymer.

* * * * *